(12) United States Patent
Binda

(10) Patent No.: US 10,029,840 B2
(45) Date of Patent: Jul. 24, 2018

(54) SELF-ADHESIVE LABEL VALVE

(71) Applicant: Masterpack S.p.A., Milan (MI) (IT)

(72) Inventor: Valerio Binda, Monvalle (IT)

(73) Assignee: MASTERPACK S.P.A., Milan (MI) (IT)

( * ) Notice: Subject to any disclaimer, the term of this patent is extended or adjusted under 35 U.S.C. 154(b) by 37 days.

(21) Appl. No.: 15/114,094

(22) PCT Filed: Jan. 26, 2015

(86) PCT No.: PCT/IB2015/050573
§ 371 (c)(1),
(2) Date: Jul. 26, 2016

(87) PCT Pub. No.: WO2015/111015
PCT Pub. Date: Jul. 30, 2015

(65) Prior Publication Data
US 2017/0001783 A1 Jan. 5, 2017

(30) Foreign Application Priority Data

Jan. 27, 2014 (IT) .............................. MI20140037 U

(51) Int. Cl.
*B65D 77/22* (2006.01)
*F16K 15/14* (2006.01)
*B31D 1/02* (2006.01)
*B65D 81/34* (2006.01)
*B31B 70/85* (2017.01)

(52) U.S. Cl.
CPC ........... *B65D 77/225* (2013.01); *B31D 1/021* (2013.01); *B65D 81/34* (2013.01); *F16K 15/14* (2013.01);
(Continued)

(58) Field of Classification Search
CPC ........... Y10T 137/784; Y10T 137/7843; Y10T 137/7879; Y10T 137/788; Y10T 137/7881;
(Continued)

(56) References Cited

U.S. PATENT DOCUMENTS 5,584,409 A * 12/1996 Chemberlen ........ B65D 77/225
220/373
5,989,608 A 11/1999 Mizuno
(Continued)

FOREIGN PATENT DOCUMENTS

AU 2006219770 A1 9/2006
EP 1157942 A1 11/2001
(Continued)

OTHER PUBLICATIONS

International Search Report and Written Opinion for International Application No. PCT/IB2015/050573. (dated May 29, 2015) (10 pages).

*Primary Examiner* — Reinaldo Sanchez-Medina
*Assistant Examiner* — Hailey K Do
(74) *Attorney, Agent, or Firm* — Lucas & Mercanti, LLP

(57) ABSTRACT

Self-adhesive label valves are disclosed having release chimneys in correspondence of a plurality of intersection cuts in a membrane-island of film (tape) carrier (C) with cuts made in the overlying self-adhesive label made of polymeric film (E) with an adhesive layer. All are inscribed within (i.e. inside) the perimeter of the membrane-island, and are destined to overlie so as to occlude pre-formed release openings in the packaging film of heatable food, and ensure in an outstandingly reliable manner a gradual release of vapors while heating, without causing an undesirable collapse of the packaging film.

7 Claims, 3 Drawing Sheets

(52) U.S. Cl.
CPC .......... *F16K 15/141* (2013.01); *F16K 15/147* (2013.01); *B31B 70/85* (2017.08); *Y10T 137/784* (2015.04); *Y10T 137/7843* (2015.04); *Y10T 137/7881* (2015.04); *Y10T 137/7895* (2015.04)

(58) Field of Classification Search
CPC .......... Y10T 137/7888; Y10T 137/895; Y10T 137/7838; Y10T 137/7839; B65D 33/01; B65D 77/225; B65D 49/02; B65D 51/1644; B65D 51/165; B65D 81/2007; B65D 81/2023; B65D 81/2015; B65D 81/22; B65D 2205/025; F16K 15/14; F16K 15/141; F16K 15/142; F16K 15/145; F16K 15/147; F16K 17/02; F16K 99/0015

See application file for complete search history.

(56) References Cited

U.S. PATENT DOCUMENTS

| | | | |
|---|---|---|---|
| 8,141,573 B2* | 3/2012 | Tai | ...................... F16K 99/0005 137/15.19 |
| 2009/0190861 A1* | 7/2009 | Turvey | ............... B65D 33/2508 383/45 |

FOREIGN PATENT DOCUMENTS

| | | |
|---|---|---|
| EP | 2275252 A1 | 1/2011 |
| FR | 2629060 A1 | 9/1989 |
| FR | 2957181 A1 | 9/2011 |
| IT | 1394911 B1 | 7/2012 |
| JP | 2006298410 A | 11/2006 |
| WO | 2004108557 A2 | 12/2004 |
| WO | 2006107974 A1 | 10/2006 |

* cited by examiner

SELF-ADHESIVE LABEL VALVE

CROSS-REFERENCE TO RELATED APPLICATIONS

This application is a 371 of PCT/IB2015/050573, filed Jan. 26, 2015, which claims the benefit of Italian Patent Application No. MI2014U000037 filed Jan. 27, 2014.

FIELD OF THE INVENTION

The present invention relates in general to techniques for packaging food products and in particular in sealed containers made of flexible heat-sealed film, which may be heated before consumption.

BACKGROUND OF THE INVENTION

It is a very common practice to package food products in sealed containers to avoid contamination and to facilitate the preservation of the product. This type of packaging, widely used in the market and/or delivery of meals may also be suitable to allow the heating/cooking of the product in a thermic or microwave oven before delivering or serving the heated food while it is still inside the package. This practice is widespread in snack-bars, fast-food restaurants, canteens, vending machines for food and the like.

When these intact airtight packages are heated an overpressure is created inside the package due to the development of steam (typically water vapor) that inflates the film of hermetic package so as to cause the rupture and/or the partial detachment of welded rims, unless the film is pierced in advance. In any case, the package delivered or served after heating assumes a non-intact appearance and moreover complicates an orderly opening of a bag-type package or the removal of the film torn or partially detached from the rim of a relatively rigid container or tub.

In order to prevent these heating effects on the content of a hermetically sealed package, special valves releasing pressurized gaseous substances have been designed and developed to be pre-applied to the film which will be used to form the bag-type packaging or to seal a rigid tub or container, for releasing pressurized vapors once to a pressure threshold is exceeded, so as not to cause an uncontrolled rupture of the film from the package.

Publication JP 2006-298410 (A) describes a valve for releasing vapors which can be manufactured alignedly on a tape support. The packaging machine provides to separate a tape portion supporting a single valve, by cutting it from the tape, and to apply it in a specific area onto an inner surface of the film which it is used to form the airtight package.

U.S. Pat. No. 5,989,608, AU 2006219770 (A1), WO 2006/107974 (A1), WO 2004/108557 (A2), EP 1157942 (A1) disclose structures of adhesive label-valves applicable to the outer surface of heat-sealable films for packaging a product or preparation by sealing an opening for releasing any overpressure inside the package.

These release structures, comprising a layer of pressure-activated adhesive and a central membrane adhering to the adhesive layer to overlap the opening formed through the heat-sealable film of the package, have a relatively high cost further burdened by a high efficient waste of the used materials and a complicated application over a release opening formed in the film line of the packaging machine.

The previous patent application VA2009A000048 (Italian Patent No. 1,394,981), in the name of the same applicant, whose content is to be understood incorporated herein by reference, describes an efficient process of manufacturing flexible adhesive label-valves that minimizes any waste, simplifies the process of manufacture of the valve labels, so that they can be individually withdrawn from a feeding tape carrier by automatic manipulators that apply "alignedly" the label-valve onto the outer surface of a suitably perforated flexible film which is used to form the heat-sealed package.

SUMMARY OF THE INVENTION

The process consists of laminating a tape carrier (C) with an anti-adherent mating surface with a tape (E) with a layer of pressure-activated adhesive, punching the only tape carrier (C), so as to define the perimeter of an island (4) of dimensions adapted to overlap and cover a release opening through the film of the sealed package, and at least a second punching of the adhesive tape (E) only to define the perimeter (2) of each label-valve (EV) separable from the anti-adherent tape carrier (C) around the area of the punched island (4) of the underlying tape carrier, and at least one cut (3) intersecting the geometrical projection of the perimeter (4) defining the island of tape carrier (C).

When the content of the sealed package is heated, a pressure generated inside the package causes the steam to insinuate between the island-membrane (4) of the anti-adherent carrier and the outer surface of the film so as to find an release through the cut (3) of the self-adhesive label-valve applied over the opening in the film of the sealed package. However, the pressure releasing mechanism may not be sufficiently gradual and the insinuation of the steam around the film opening, between the outer surface of the film and the non-adhesive surface of the punched island (4) covering the opening, may be delayed and give rise to a too sudden and lively release.

The applicant has now found a punch geometry of the constituent parts of the label-valve that eliminates the drawback due to the occasionally erratic behavior of the label-valves produced according to the manufacturing process of the previous patent application.

Protracted test sessions have demonstrated the absolute reliability of the label-valve according to the present invention in ensuring a perfectly gradual release of pressurized vapors in countless types of sealed food packages which can be heated.

Basically, the new geometry of the punch footprints of the sheet or tape material of the anti-adherent carrier coupled with a self-adhesive sheet or tape, namely a polymeric sheet or tape with a layer of pressure-activated adhesive on the coupling face, determines the intersection in one or more points of cuts produced respectively in anti-adherent carrier material of an island-membrane defined by means of punching the only tape carrier of the coupled product, and of the only material of self-adhesive label of the coupled product, within the geometric projection of the area of the underlying punched island-membrane of anti-adherent carrier material which operatively covers the release opening, be it a hole, a set of holes or cuts, pre-formed in the film of the sealed package.

According to the above-defined geometry of mutual punching of the two layers or films forming the label-valve, the release mechanism of pressurized vapors occurs, no longer as in the case of the geometries described in the above mentioned prior patent, by insinuation/detachment between the surfaces of the island-membrane of anti-adherent carrier material and the outer surface of the film, around a release opening defined in it, until they reach and escape from the perimeter of the island-membrane and then find the way to be released through the cut or cuts in the overlying self-adhesive material of the label-valve, but through a progressive opening of a release chimney that originates at the intersections of cuts, in the anti-adherent carrier material of the island-membrane and in the overlying self-adhesive material of the label, respectively, geometrically coordinated with each other.

DETAILED DESCRIPTION OF THE INVENTION

Referring to the figures, the island-membrane 4 of the anti-adherent film carrier C of the multilayer film subjected to punching from a first side and after from the opposite side according to the process illustrated in the prior Italian Patent No 1394981 in the name of the same applicant, may be of a material belonging to the group composed of polypropylene (for example of a thickness comprised between about 35 and 60 µm), polyester (for example of a thickness comprised between about 25 and 45 µm), polymeric materials with equivalent characteristics or paper of a thickness comprised between 20 and 500 µm. The coupling surface of the tape carrier C from which the label-valve EV having the island-membrane 4 defined by punching the same tape carrier C, is commonly treated with silicone for determining its anti-adherence properties.

The film E with pressure-activated adhesive layer of the laminated multilayer, in which the adhesive labels are defined by punching may be of a material belonging to the group composed of polypropylene (PPE) (for example of a thickness comprised between 35 and 65 µm), polyester (PET) (for example of a thickness comprised between about 25 and 45 µm or of another material with equivalent properties), or laminated multilayers of the same plastic materials or of one of them with a film of polyamide (of a thickness comprised for example between 10 and 20 µm), or a laminated multilayer PE-Evoh-PE.

The layer of adhesive applied on the coupling face of the film E for defining the adhesive labels of the multilayer may be a common water-based acrylic or a UV crosslinking or acrylic with organic solvent adhesive, or a silicone-based adhesive for high temperatures (up to 250° C.).

Figure 1:
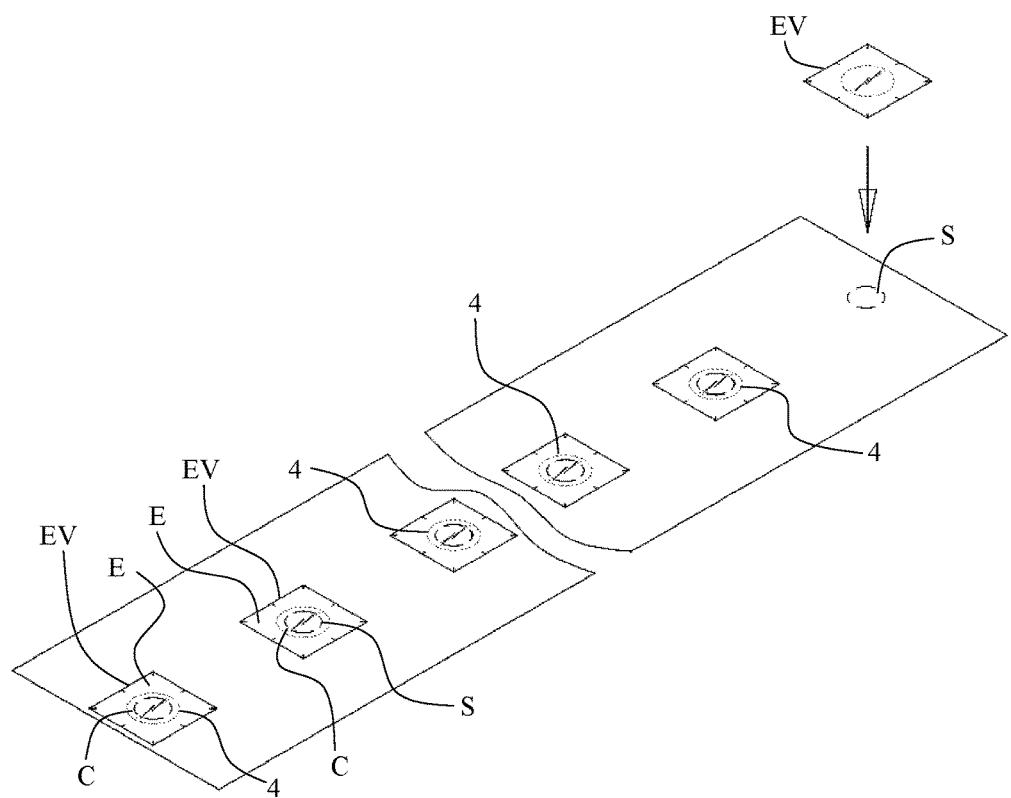
FIG. 1 shows in a schematic way the application of self-adhesive valve labels of the present invention onto a film for packaging products in heat-sealed packages.

Referring to FIG. 1, the label-valves EV may be singularly taken by common holding means with suction cups, or automatically applied by means of labeling machines, by separating them from the carrier tape of anti-adherent film, each carrying therewith an island-membrane 4 of anti-adherent film C of tape carrier, defined by punching the same tape carrier, in correspondence of a relatively small area, more or less centered in respect to the definition area of the overlying label of film E, with an adhesive layer on the coupling face.

The same holding means thus apply the label-valve EV precisely ("alignedly") above a pre-shaped release opening in the feed film of a machine for packaging products destined to be heated in the same sealed packaging.

In the scheme shown in FIG. 1, the release opening pre-shaped in the packaging film consists of four cuts for as many circumferential arches, through which vapors under pressure generated by heating the content of the packaging could flow.

Figure 2:
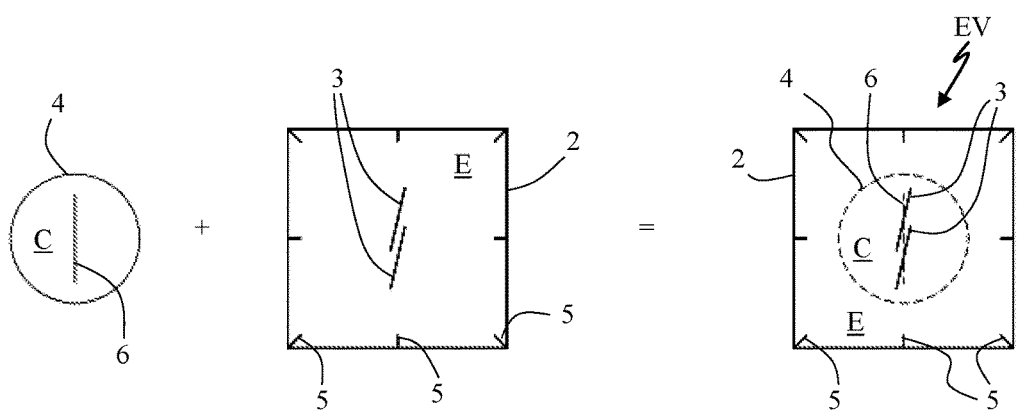
FIG. 2 illustrates an example of the geometric coordination of the cuts made respectively on the tape or sheet carrier and on the self-adhesive tape or sheet and intersecting with each other, according to the present invention.

FIG. 2 shows the punching scheme of the laminated multilayer tape of anti-adherent film carrier C and of the film E with pressure-activated adhesive layer, in two distinct steps: from one side and from the opposite side of the laminated multilayer.

The anti-adherent film carrier C of the multilayer is punching according to the engraving impression shown at the left, defining an island-membrane 4 of an anti-adherent film carrier C that in the shown example has a circular perimeter, and an inner cut 6 i.e. inscribed in the circular perimeter of definition of the island-membrane 4.

The film E with the pressure activated adhesive layer is punched according to the engraving impression shown at the side of the first impression, defining the perimeter 2 of definition of the self-adhesive label of film E with the pressure activated adhesive layer, that in the example has a squared perimeter, and two inclined cuts 3 that by superposition are inscribed in (internal) the geometrical projection of the definition perimeter of the undelaying island-membrane 4 of anti-adherent film carrier C, and intersect the cut 6 in two points.

Optionally, in the sole film E also cuts 5 may be made along the definition perimeter as shown or, as an alternative, short arched cuts distributed along the perimetric region may be made, so as to constitute effective integrity proofs (because they cause irreversible distortions of the adhesive label in case of tampering).

Figure 3:
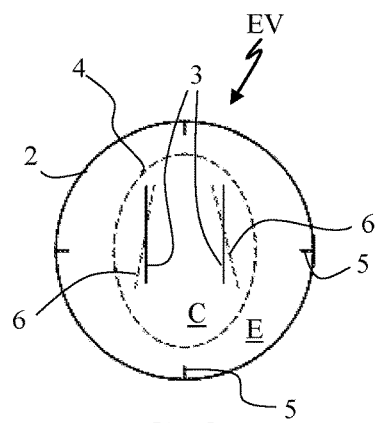
FIG. 3 shows an alternative example of the layout of the cuts intersecting in the anti-adherent island-membrane and in the overlying self-adhesive material of the label-valve.
Figure 4:
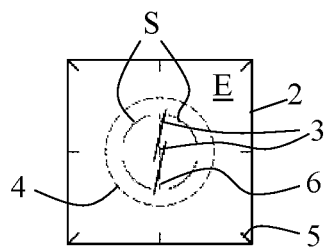
FIGS. 4 to 11 show alternative layout examples of the cuts intersecting respectively formed in the anti-adherent island-membrane and in the overlying self-adhesive material of the label-valve, and their coordination with respect to the footprints of the release openings pre-formed in an underlying film packaging products heated in heat-sealed packages.
Figure 5:
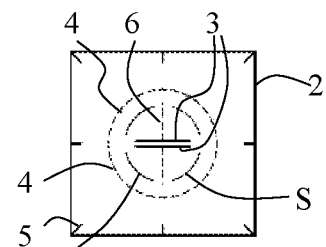
Figure 6:
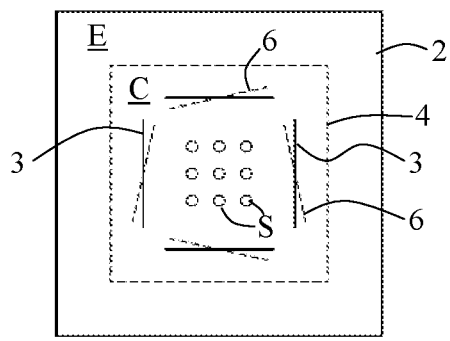
Figure 7:
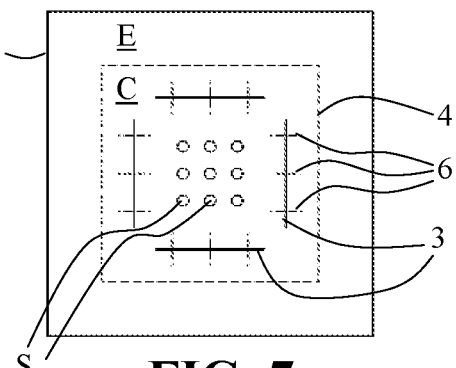
Figure 8:
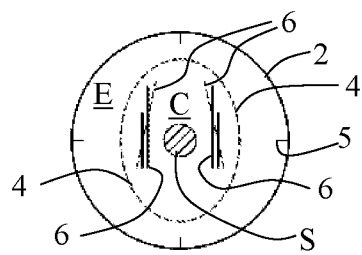
Figure 9:
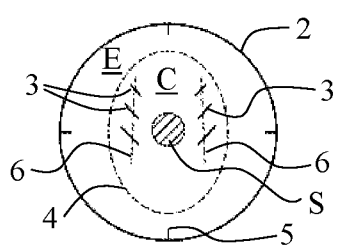
Figure 10:
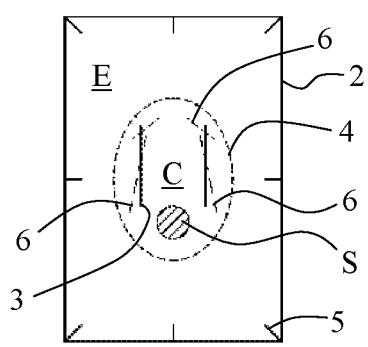
Figure 11:
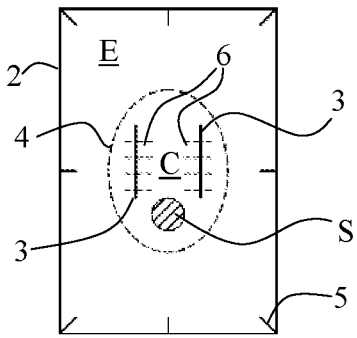

FIG. 3 shows another exemplary layout of the respective punched impressions of the anti-adherent film carrier C and of the film E with a pressure activated adhesive layer of the tape of laminated multilayer.

In this embodiment two points of intersection between cuts, respectively in the self-adhesive film E of the self-adhesive label-valve EV and in the underlying island-membrane 4 of anti-adherent film carrier C, are realized by intersection of pairs of cuts formed through the respective films E and C.

Figures from 4 to 11 show alternative exemplary layouts of intersecting cuts, through which effective release chimneys are made for vapors under pressure formed in the island-membrane 4 of anti-adherent film carrier C and in the overlying self-adhesive film E of the label-valve EV, and their disposition in respect to the geometrical projection of release openings S, pre-shaped in an underlying film for packaging products that may be heated in thermo-sealed packages.

Preferably, the cut or cuts 6 formed in the island-membrane 4 of film (tape) carrier destined to overlie and shut one or more release openings present in the underlying packaging film, do not intersect any release hole or cut S made through the underlying packaging film.

The realization of these release chimneys in a plurality of intersection points of cuts 6 in the island-membrane 4 of film (tape) carrier with cuts in the overlying self-adhesive label, all inscribed (i.e. inside) in the perimeter of the island-membrane 4, ensures in an extraordinarily reliable manner the prolonged release of vapors while heating the content of the sealed packaging, without provoking an undesirable collapse of the packaging film that, by contrast, could occasionally occur with the previously used punching geometries as a consequence of a too delayed and abrupt opening of the label-valve.

The invention claimed is:

1. A self-adhesive label-valve comprising:
    an island-membrane having a perimeter and provided with an anti-adherent surface, and
    a polymeric adhesive label having a perimeter and a coupling surface which comprises
    a pressure activated adhesive layer and is coupled with the anti-adherent surface of the island-membrane,
    wherein the polymeric adhesive label is further provided with one or more cuts
    inscribed in a geometrical projection of the perimeter of the island-membrane, and
    wherein the island-membrane is provided with one or more cuts which are arranged inside the perimeter of the island membrane and which intersect a geometrical projection of one or more of cuts of the polymeric adhesive label.

2. The self-adhesive label-valve according to claim 1, wherein the polymeric adhesive label is provided with at least one release opening and said one or more cuts of said island-membrane do not intersect a geometrical projection of the at least one release opening.

3. The self-adhesive label-valve according to claim 1, wherein the polymeric adhesive label further comprises proofs of tampering which are a plurality of cuts, departing from the perimeter of the polymeric adhesive label.

4. The self-adhesive label-valve of claim 1, wherein said island-membrane is made of a material selected from a group consisting of polypropylene having a thickness of between 35 and 60 μm, polyester having a thickness of between 25 and 45 μm and paper of a thickness of between 20 and 500 μm.

5. The self-adhesive label-valve of claim 1, wherein said polymeric adhesive label, is made of a material selected from a group consisting of polypropylene having a thickness of between 35 and 60 μm, polyester having a thickness of between 25 and 45 μm and laminated multilayers of polypropylene or polyester with a film of polyamide or Evoh having a thickness of between 10 and 20 μm.

6. The self-adhesive label-valve of claim 1, wherein said pressure activated adhesive is a water based acrylic or an organic or silicone solvent adhesive.

7. The self-adhesive label-valve of claim 1, wherein the anti-adherent surface of the island-membrane is treated with a silicone based material.

* * * * *